UNITED STATES PATENT OFFICE 2,344,489

LIGHT STABILIZED VINYLIDENE CHLORIDE PRODUCT

Raymond F. Boyer, Lorne A. Matheson, and Clarence L. Moyle, Midland, Mich., assignors to The Dow Chemical Company, Midland, Mich., a corporation of Michigan No Drawing. Application November 6, 1940, Serial No. 364,544

8 Claims. (Cl. 260—92.5)

The present invention relates to compositions comprising polymeric vinylidene chloride products and certain light stabilizers therefor.

The polymers of vinylidene chloride alone, its co-polymers and other polymerizable materials, various plasticized compositions thereof, and certain ways in which they may be made are described in U. S. Patents Nos. 2,160,903-4 and 2,160,931-948. The polymers of vinylidene chloride alone and its co-polymers and plasticized compositions are herein referred to as "polymeric vinylidene chloride products." These products, or most of them, are capable of being molded to form useful articles under the combined effects of heat and pressure. Some of them exhibit sufficient solubility in certain solvents, more particularly at elevated temperatures, to permit their being cast as films. In most cases, the articles produced either by molding, extrusion, or by casting from solution of polymeric vinylidene chloride products are subject to decomposition when exposed for prolonged periods to the effects of light or of heat. This appears to be particularly true of articles having thin cross-section, especially when they are subjected to the effects of ultraviolet light. This apparent shortcoming of articles produced from polymeric vinylidene chloride products makes it highly desirable to obtain stabilizers for these products which will prevent, or at least minimize, the darkening effect heretofore observed when the products have been exposed to light or heat.

It is, accordingly, among the objects of the present invention to provide a polymeric vinylidene chloride product stabilized against the darkening and embrittling effects of light or of heat. Another object is to provide a composition comprising a polymeric vinylidene chloride product and a light stabilizer therefor. Particular objects will appear hereinafter.

It has now been found that the foregoing and related objects may be attained to an unexpectedly great extent through the incorporation in a polymeric vinylidene chloride product, of one or more di-halogen-ortho-nitro-phenols. The di-halogen-ortho-nitro-phenols may be incorporated in the polymeric vinylidene chloride product in amounts which generally vary from about 0.5 to about 3 per cent based on the weight of said polymers or co-polymers. For most purposes it has been found that about 1 per cent of the di-halogen-ortho-nitro-phenol compound is sufficient to effect the desired stabilizing action against light. The di-halogen-ortho-nitro-phenols used in the present invention have been found to be considerably superior, as stabilizers for vinylidene chloride, to the other ortho-nitro-phenols which do not contain two halogen substituents.

The stabilizers here employed may be any compound of the benzene series which has a nitro group and a hydroxyl group on adjacent carbon atoms, and which has two atoms of halogen substituted in the benzene nucleus. Other substituents, e. g. hydrocarbon radicals, may be present, provided the above-stated essential requirements have been met. The compounds have the general formula

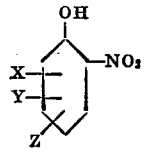

wherein X and Y are the same or different halogen atoms and Z may be any other substituent or hydrogen.

The di-halogen-ortho-nitro-phenol compound may be added to the polymeric product in various ways. For example, if the polymer or co-polymer is capable of being dispersed or dissolved in an organic solvent, the stabilizer may be added to the said solution and the stabilized polymeric product obtained from the solution in the desired form. Alternatively, the polymeric product may be masticated with the stabilizer, which may suitably be dissolved in a small amount of solvent, on compounding rolls in the methods well known to the art.

Regardless of the manner in which the herein concerned stabilizers are added to the polymeric products, it has been found that they exhibit a remarkable stabilizing effect on the polymeric material when the latter is exposed to light. Thus, an untreated film or filament of a vinylidene chloride product may assume a dark brown or black coloration after prolonged exposure to sunlight. By way of contrast, the composition containing relatively small amounts of a di-halogen-ortho-nitro-phenol compound, when exposed to sunlight in like manner and in the same physical state, will resist discoloration for periods up to several months.

The following example illustrates the practice of the present invention.

A 20 per cent solution in dioxane of the co-polymer of vinylidene chloride with about 8 per cent of ethyl acrylate was treated with the indicated per cent, based on the weight of co-polymer present, of each of the di-halogen-ortho-nitro-phenol compounds listed in the following table. From the so-formed solution of the co-polymer and stabilizing agents films 0.003 inch thick were cast on clear glass plates and were then exposed in the fadeometer for the indicated length of time. An observation was made of the per cent of the available visible light which was transmitted through the samples both before and after exposure. This factor gives an indication of the amount of darkening on exposure to light.

Table

| Dihalo-nitro-phenol compound | Conc., per cent | Per cent visible transmission exposure in hours | | | |
|---|---|---|---|---|---|
| | | 0 | 80 | 150 | 280 |
| 4-bromo-6-chloro-2-nitro-phenol | ½ | 19 | 82 | 56 | 28 |
| | 1 | 92 | 90 | 89 | 79 |
| | 2 | 89 | 87 | 81 | |
| | 3 | 92 | 89 | 88 | 87 |
| 4.6-dichloro-2-nitro-phenol | ½ | 92 | 62 | 41 | 24 |
| | 1 | 91 | 89 | 77 | 41 |
| | 3 | 91 | 89 | 89 | 85 |
| Average of 15 blanks | | 92 | 68 | 46 | 34 |

| Dihalo-nitro-phenol compound | Conc. per cent | Exposure in hours | | |
|---|---|---|---|---|
| | | 0 | 70 | 154 |
| 6-bromo-4-chloro-2-nitro-phenol | ½ | 88 | 83 | 54 |
| | 1 | 88 | 87 | 83 |
| | 2 | 89 | 87 | 83 |
| | 3 | 87 | 87 | 85 |
| 4.6-dibromo-2-nitro-phenol | ½ | 90 | 79 | 54 |
| | 1 | 89 | 80 | 70 |
| | 2 | 89 | 80 | 69 |
| | 3 | 88 | 82 | 71 |
| Average of 4 blanks | | 88 | 70 | 41 |

The stabilizing effect of the preferred compounds herein disclosed can be observed when molded or extruded articles made of polymeric vinylidene chloride products are superficially coated with a vinylidene chloride co-polymer lacquer containing the herein described stabilizing agents.

The invention has been illustrated with particular reference to the co-polymer of vinylidene chloride and ethyl acrylate. It is to be understood that the invention is not limited to its use in connection with this co-polymer but may be applied at least as effectively to other co-polymers of vinylidene chloride such as those with vinyl chloride, vinyl acetate, styrene, methyl methacrylate, and the like. In its practical application, the invention appears to be limited only by the requirement that the polymeric vinylidene chloride product to be treated is one which, without a light stabilizing agent, shows evidence of decomposition when exposed to light.

We claim:

1. A composition of matter comprising a polymeric vinylidene chloride product and stabilizing amounts, of the order of 1 per cent based on the weight of the polymeric product of a chloro-bromo-ortho-nitro-phenol.

2. A composition of matter comprising a polymeric vinylidene chloride product and stabilizing amounts, of the order of 1 per cent based on the weight of the polymeric product of 4-bromo-6-chloro-2-nitro-phenol.

3. A composition of matter comprising a polymeric vinylidene chloride product and stabilizing amounts, of the order of 1 per cent based on the weight of the polymeric product of a dibromo-ortho-nitro-phenol.

4. A composition of matter comprising a polymeric vinylidine chloride product and stabilizing amounts, of the order of 1 per cent based on the weight of the polymeric product of 4.6-dibromo-2-nitro-phenol.

5. A composition of matter comprising a polymeric vinylidine chloride product and stabilizing amounts, of the order of 1 per cent based on the weight of the polymeric product of a dichloro-ortho-nitro-phenol.

6. A composition of matter comprising a polymeric vinylidene chloride product and stabilizing amounts, of the order of 1 per cent based on the weight of the polymeric product of 4.6-dichloro-2-nitro-phenol.

7. A composition of matter comprising a polymeric vinylidine chloride product and stabilizing amounts of a dihalo-ortho-nitro-phenol wherein the halogen is selected from the group consisting of chlorine and bromine.

8. A composition of matter comprising a polymeric vinylidene chloride product and stabilizing amounts, of the order of 1 per cent based on the weight of the polymeric product, of a dihalo-ortho-nitro-phenol wherein the halogen is selected from the group consisting of chlorine and bromine.

RAYMOND F. BOYER.
LORNE A. MATHESON.
CLARENCE L. MOYLE.